W. E. DAHN.
STONE RAKE.
APPLICATION FILED MAR. 27, 1916.

1,211,552.

Patented Jan. 9, 1917.
2 SHEETS—SHEET 1.

WITNESSES

INVENTOR
Willard E. Dahn
BY
ATTORNEY

W. E. DAHN.
STONE RAKE.
APPLICATION FILED MAR. 27, 1916.
1,211,552.
Patented Jan. 9, 1917.
2 SHEETS—SHEET 2.
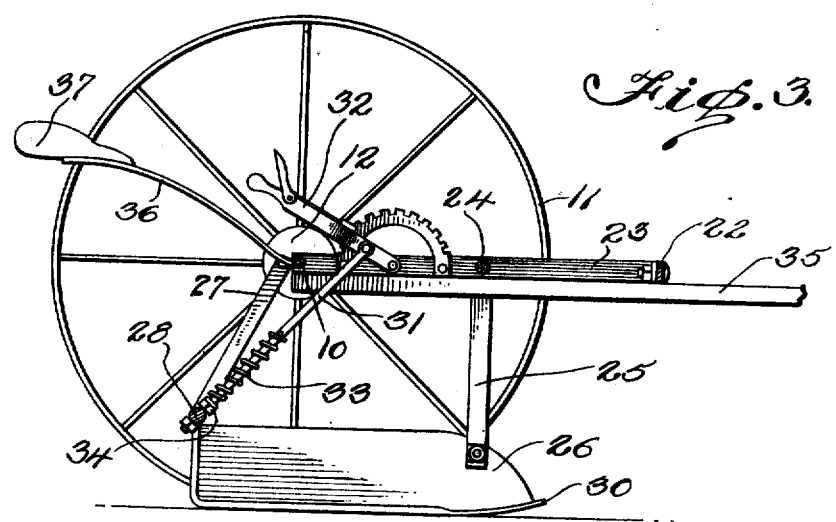
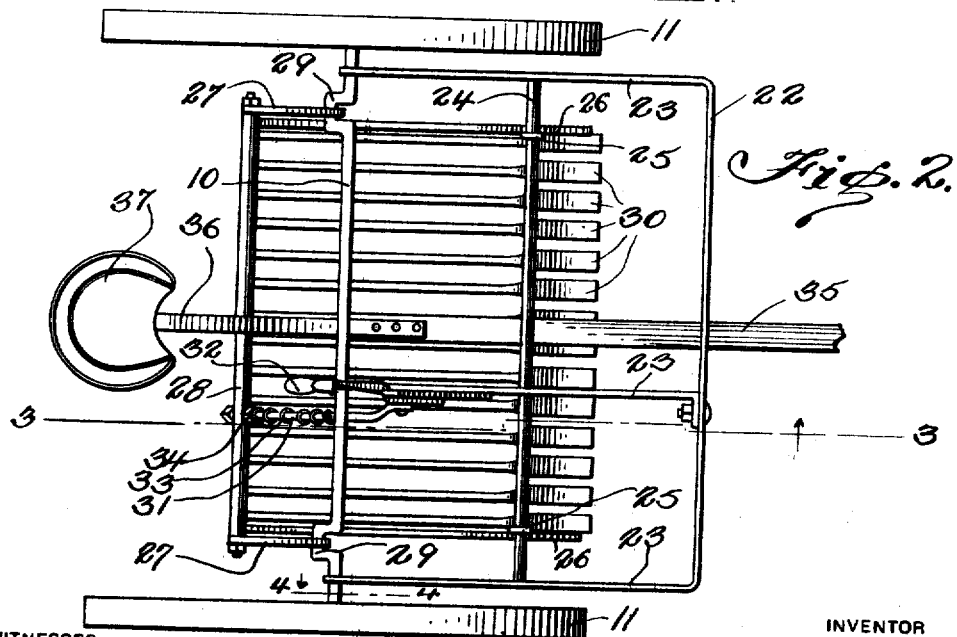
WITNESSES
INVENTOR
Willard E. Dahn
BY
ATTORNEY

UNITED STATES PATENT OFFICE.

WILLARD E. DAHN, OF HARLEM, MONTANA.

STONE-RAKE.

1,211,552.

Specification of Letters Patent. Patented Jan. 9, 1917.

Application filed March 27, 1916. Serial No. 87,058.

*To all whom it may concern:*

Be it known that I, WILLARD E. DAHN, a citizen of the United States, residing at Harlem, in the county of Blaine and State of Montana, have invented certain new and useful Improvements in Stone-Rakes, of which the following is a specification.

This invention relates to an improved rake for removing stones and gravel from a field and the principal object of the invention is to provide a rake which can remove stones from a harrowed field and which is so mounted that it will receive a reciprocating movement tending to sift dirt taken up with the stones but at the same time leave the stones in the receptacle.

Another object of the invention is to so mount the receptacle that it may be raised for emptying the stones at the end of the field and further to so mount the receptacle that it may be vertically adjusted according to the depth it is desired to have the ends of the prongs dig into the soil.

Another object of the invention is to provide a rake of the character described which will be composed of a comparatively small number of parts, easy to assemble and adjust and not liable to readily get out of order or need repair.

This improved stone rake is illustrated in the accompanying drawings, wherein:—

Figure 1:
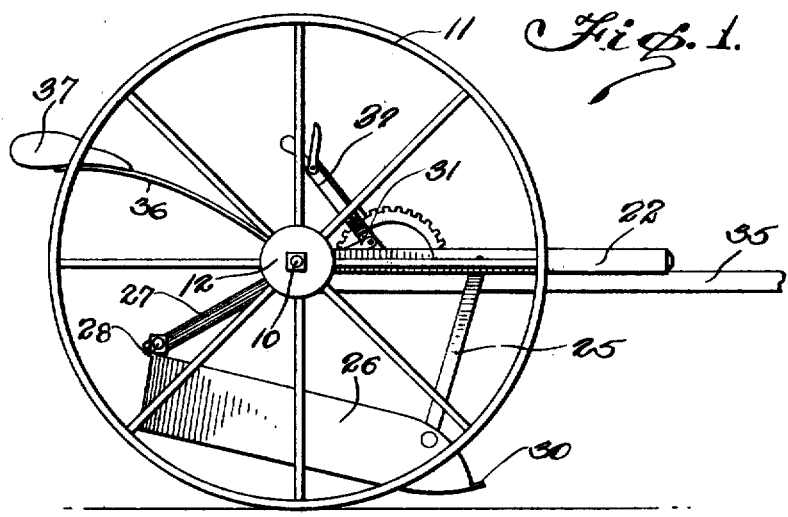
Figure 4:
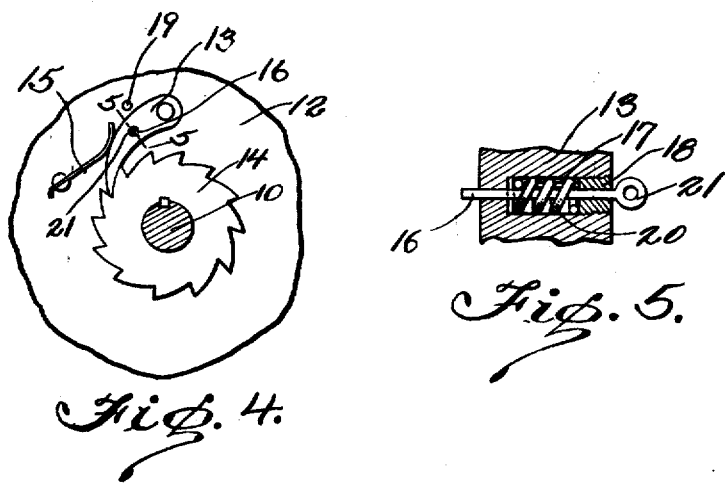
Figure 5:
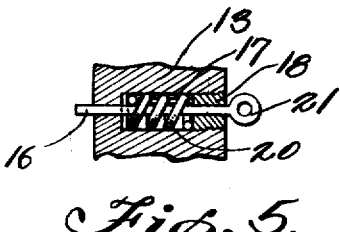

Figure 1 is a view showing the improved rake in side elevation. Fig. 2 is a view showing the improved rake in top plan. Fig. 3 is a vertical, longitudinal sectional view taken along the line 3—3 of Fig. 2. Fig. 4 is a fragmentary view taken along the line 4—4 of Fig. 2. Fig. 5 is a sectional view through the pawl taken along the line 5—5 of Fig. 4.

The supporting axle 10 of this machine which constitutes a crank shaft carries the wheels 11 which are rotatably mounted upon the axle and have their hubs 12 enlarged as shown in Figs. 1 and 3. The hub 12 of one or both of these wheels is provided with a pawl 13 which is yieldably held in engagement with a ratchet 14 rigidly mounted upon the axle 10. This pawl 13 will be yieldably held in engagement with the ratchet by means of the spring 15 and therefore when the machine is moving forwardly, the axle will be rotated. In order to releasably hold the pawl 13 out of engagement with the ratchet 14 and thus permit the machine to be drawn forwardly without the axle rotating, there has been provided a latch pin 16 which pin is held within the pocket 17 of the pawl by means of the threaded plug 18 and yieldably held in a position to enter the opening 19 in the wheel hub 12 by means of the springs 20. A head or eye 21 is provided for the latch pin so that this latch pin can be drawn outwardly to permit the springs 15 to return the pawl into engagement with the ratchet 14.

A frame 22 has its arms 23 loosely mounted upon the end portions of the axle 10 and carries a cross bar or rod 24 which cross bar extends between the arms 23 and carries links 25 serving to support the pan 26. The rear end portion of this pan is supported by the links 27 mounted upon the rod 28 and connected with the crank 29 of the crank shaft or axle 10. Therefore as the axle rotates the pan or receptacle will be reciprocated with a vertical swinging movement serving to agitate the rock and stone removed from the field by the rake teeth 30 thus causing the dirt to sift through between the teeth. The rocks will be retained in the pan or receptacle. When the end of the field is reached, the pan will be tilted through the medium of the rod 31 and latch lever 32 and the stones will be deposited in a pile upon the ground. It should be noted that this rod 31 carries a spring 33 which engages the abutment 34 and therefore serves to yieldably retain the pan in the proper position but permits movement of the pan when necessary.

The draft tongue 35 will be connected with the frame 22 and cross bar 24 in any suitable manner and has its rear end portion extended for engagement with the standards 36 of the driver's seat 37.

It will thus be seen that there is provided a rake which is so constructed that stone can be removed from a field after the field has been harrowed and prior to planting, the machine being so constructed that the dirt gathered with the stone can be shaken out of the pan or receptacle. There has further been provided a machine so constructed that the stones in the receptacle may be deposited in a pile at the end of the field and further there has been provided a machine so constructed that the pan may be prevented from moving when conveying the rake from one field to another and also there has been provided a machine so constructed that the pan may be held at a desired angle thus permitting the teeth of the rake to extend at the proper angle for gathering the rock and stone from the field. I have therefore provided a machine which will operate very efficiently and which can be easily operated, the mechanism being simple in construction and easy to assemble and control.

What is claimed is:—

1. A stone rake comprising a frame including a transversely extending bar, an axle rotatably carried by said frame and constituting a crank shaft, supporting wheels mounted upon the axle and turning the axle with the wheels, a receptacle having its bottom formed of longitudinally extending fingers, links connecting the forward end portion of said receptacle with the cross bar of said frame, a shaft carried by the rear portion of said receptacle, links connecting said shaft with said crank shaft, and means for releasably holding said receptacle in an adjusted position.

2. A stone rake comprising a frame, an axle connected with said frame and constituting a crank shaft, a receptacle having teeth forming a bottom, links connected with said crank shaft and with the rear portion of said receptacle, links connected with said frame and with the forward portion of said receptacle, and means for rotating said crank shaft.

3. A stone rake comprising a frame, a crank shaft connected with said frame, an adjusting lever, a rod extending from said adjusting lever, a receptacle slidably connected with said rod, resilient means mounted upon said rod yieldably holding the receptacle at a point adjacent the outer end of the rod, links connected with said crank shaft and with said receptacle, and links connected with said frame and with said receptacle.

4. A stone rake comprising a frame, a crank shaft connected with said frame, supporting wheels mounted upon said crank shaft, means for releasably connecting the crank shaft with one of the supporting wheels to turn the crank shaft with the wheel, a receptacle, links connecting said receptacle with said crank shaft, and links connecting said receptacle with said frame.

In testimony whereof I affix my signature in presence of two witnesses.

WILLARD E. DAHN.

Witnesses:
G. R. Barton,
E. S. Mimegh.

Copies of this patent may be obtained for five cents each, by addressing the "Commissioner of Patents, Washington, D. C."